Feb. 13, 1962 A. F. HASBROOK 3,020,970
APPARATUS FOR SONIC GEOPHYSICAL EXPLORATION
Filed Jan. 13, 1958 2 Sheets-Sheet 1
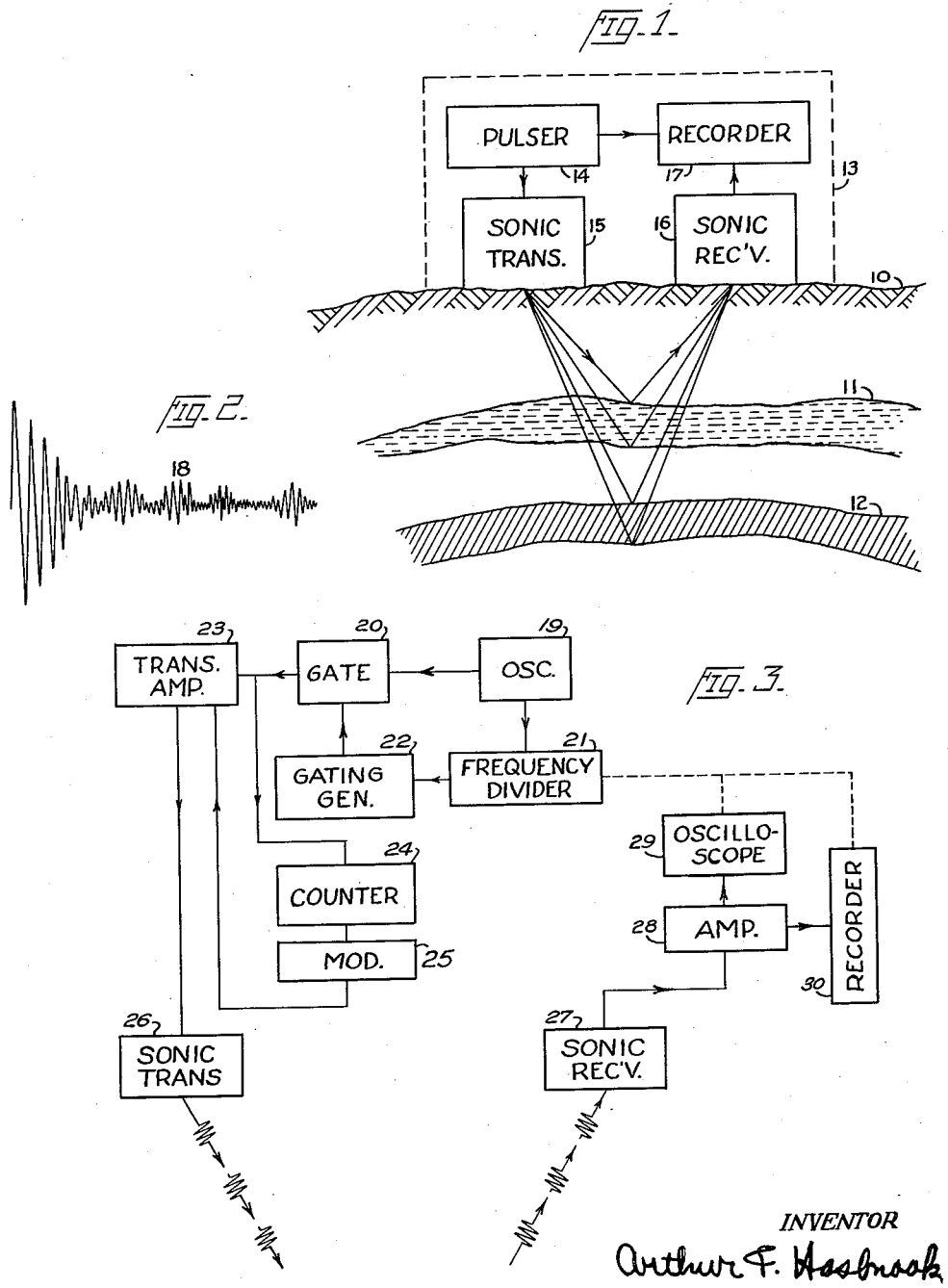
INVENTOR
Arthur F. Hasbrook

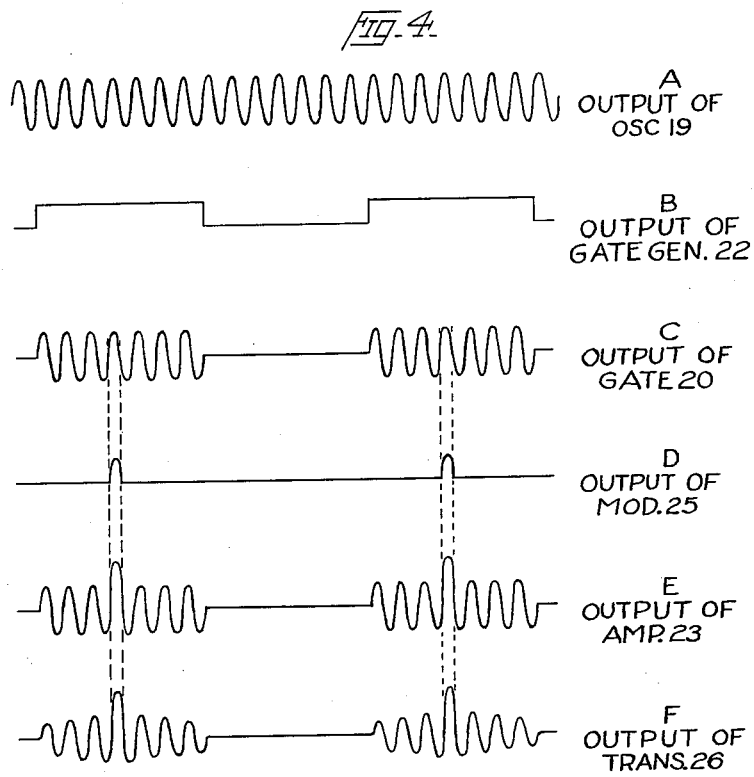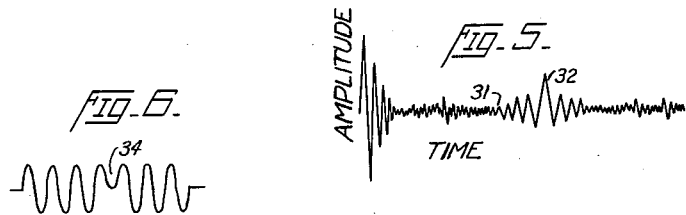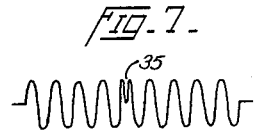

United States Patent Office 3,020,970
Patented Feb. 13, 1962

3,020,970
APPARATUS FOR SONIC GEOPHYSICAL EXPLORATION
Arthur F. Hasbrook, Bexar County, Tex., assignor to Olive S. Petty, San Antonio, Tex.
Filed Jan. 13, 1958, Ser. No. 708,464
1 Claim. (Cl. 181—.5)

This invention relates to sonic geophysical exploration and particularly to improvements for more accurately interpreting and utilizing sonic signals which have traveled through the sub-surface regions of the earth. More specifically the invention is directed toward providing sonic signals which have certain distinctive characteristics which permit of easier recognition and more accurate utilization in interpretation of the sub-surface through which the signals have been propagated.

In one general type of sonic exploration for sub-surface geological features which may be associated with valuable mineral or petroleum deposits, the procedure is to impress a series of sonic impulses on the surface or near-surface of the earth and to intercept, detect and record the resulting delayed signals which have traveled over various paths through the sub-surface. When satisfactory sub-surface conditions exist, it is possible to identify numerous reflections from the interfaces beneath the surface. The travel times of these reflections may be determined and the depths of associated interfaces calculated, assuming a knowledge of the velocity. Recordings of the sonic reflections from the sub-surface beds may be made at different positions on the earth, and these recordings assembled so as to represent a geological cross section of the earth. Quite frequently, however, the sonic reflections are distorted so that accurate timing of the onsets, or even recognition of the reflection, is difficult; under such conditions it may not be possible to correlate the various reflections with the proper geological strata.

Accordingly it is a primary object of this invention to provide an improved method for generating and utilizing sonic signals for sub-surface exploration. Another object is to provide a sonic exploration system in which the signals have distinctive and easily recognizable characteristics. Still another object is to provide sonic signals in which at least one cycle is distinctively marked so as to facilitate timing and analysis of travel-paths.

Stated briefly, the foregoing and other objects are accomplished in a method and apparatus for sonic geophysical exploration in which the sonic impulses, which are impressed on the surface of the earth, are made distinctive in character. The resulting sonic signals, which travel through the sub-surface, retain this distinctiveness to a considerable degree so as to permit increased accuracy in recognition of certain reflections and in determination of the travel-times. In the past it has been well-known to utilize a repetitive series of spaced sonic impulses in which series each pulse is comprised by a number of higher frequency cycles of essentially the same characteristics. For example, all of the cycles in the sonic impulse usually are of the same frequency and amplitude. With this relatively uniform sonic impulse, the resulting sonic signal has similarly uniform characteristics, such that in the presence of noise and reverberation it becomes difficult to determine the initial onset and to provide accurate timing. In my invention, at least one of the higher frequency cycles in the sonic impulse is distinctively marked so as to be easily recognizable. Such distinctive marking may be accomplished by an increase or decrease in amplitude, by distorting the cycle or in other ways which will occur to those familiar with the art.

The foregoing and other objects and features of the invention will be better understood from the following description and the accompanying drawings, in which FIGURE 1 is a cross section of the earth in conjunction with a block diagram illustrating the typical arrangement for sonic geophysical prospecting;

FIGURE 2 is a graph showing a typical sonic recording made according to prior art;

FIGURE 3 is a block diagram illustrating one arrangement of the present invention;

FIGURE 4 represents a series of curves, designated A to F, indicative of the nature of the signal energy at various points in the system of FIGURE 3;

FIGURE 5 is a graph showing a sonic recording made according to the present invention; and FIGURES 6 and 7 are curves representative of variant forms of transmitter output signal energy.

Referring now to FIGURE 1 of the drawings, a cross section of the earth is shown diagrammatically with surface 10 and several reflecting sub-surface beds 11 and 12. In a typical prospecting arrangement the sonic equipment 13, shown in the dotted enclosure, is set up on the surface 10 and operated so as to direct signals toward and receive reflections from the sub-surface beds 11 and 12. In its most simple form equipment 13 will be comprised by a sonic transmitter 15, a pulser unit 14, sonic receiver 16 and signal recorder 17. Although transmitter 15 and receiver 16 may be comprised by a single unit in some arrangements, separate units are shown for clarity in illustration and discussion. Any of the well-known types, such as magneto-strictive or crystal, may be used for transmitter 15 and receiver 16. Pulser unit 14, which is a source of pulse power required for the excitation of sonic transmitter 15, is arranged to produce a continuous series of equally spaced pulses, each of which contains a number of cycles of higher frequency carrier wave. The pulse duration, repetition rate and carrier frequency all must be properly chosen for the desired maximum depth of penetration and for the earth constants of the particular prospect area. In a typical arrangement the pulse duration may be in the range from one to ten milliseconds, the repetition rate from one to twenty pulses per second and the carrier frequency from one thousand to fifty thousand cycles per second. Signal recorder 17 may be any type suitable for displaying the reflected sonic signals, intercepted by receiver 17, as a function of time.

Operation of the typical arrangement shown in FIGURE 1 may be described briefly as follows. Electrical pulse energy from pulser unit 14 is applied to sonic transmitter 15 so as to impress sonic impulses upon the surface 10 of the earth. Simultaneously with excitation of transmitter unit 15, a signal from pulser 16 causes the signal recorder 17 either to start operation or to pass through a zero position. Sonic pulses from transmitter unit 15 then travel through the sub-surface layers of the earth as sonic signals and are partially reflected at the interfaces of the several sub-surface beds 11 and 12. These reflected sonic signals are directed back toward the surface 10 and intercepted by sonic receiver 16. The electrical signal outputs of receiver 16, representing sonic signals, are then applied to the recording medium in signal recorder 17. Although recorder 17 may be arranged to record only the resultant signal from a single sonic pulse at transmitter 15, it is preferable to combine a considerable number of pulses in order to effect a more useful recording. For example, if the recording medium in recorder 17 is moved past the recording pen or other device in synchronism with the pulses emitted by transmitter 15, then a large number of pulse signals may be combined at the same positions on the recording medium so as to improve the signal-to-noise ratio. From such recordings the depths of various sub-surface strata may be determined. Furthermore, a large number of continuous or closely-spaced recordings, made across a given prospect area, may be arranged on a single display medium so as to furnish a cross-sectional view of the sub-surface beneath the traverse.

Under ideal conditions of the sub-surface, the recordings made with the arrangement of FIGURE 1 will provide useful indications of the reflections from various strata within the earth. More commonly the reflections will be somewhat obscured by reverberation and noise such that the onset of each reflection is difficult to determine. This problem is illustrated in FIGURE 2 which shows the variation of the recorded signal with time. It will be noted that the position of the onset of reflection 18, with respect to time, is difficult to locate because of the noise and reverberation level.

Referring now to FIGURE 3, an arrangement of the present invention is shown for distinctively marking the transmitted sonic impulses so as to facilitate recognition and timing of reflection signals. The source of the sonic impulses is sonic transmitter 26 which may be of the magneto-strictive or crystal type. Transmitter 26 may be closely coupled to the earth through any suitable means; for example, a layer of mud, water, grease or other soft material may be interposed between transmitter 26 and the surface of the earth. In some instances it may be desirable to bury transmitter 26 in the earth, either partially or completely. Pulse power to drive transmitter 26 is furnished by a pulser system comprised by a carrier frequency oscillator 19, gate 20, frequency divider 21, gating generator 22, transmitting amplifier 23, counter 24 and modulator 25. Carrier frequency oscillator 19 may be any suitable type which can supply a stable sinewave frequency in the desired operating range. The sinewave output frequency from oscillator 19 is supplied to the electronic gate 20, which is normally nonconducting, and to a frequency divider 21 which reduces the carrier oscillator frequency from 19 to the desired low value required to establish the pulse repetition frequency for the system. The lower frequency waveform from frequency divider 21 actuates a gating generator 22 which supplies a pulse of the desired duration to electronic gate 20. Gate 20 then permits the carrier frequency sinewaves from oscillator 19 to be applied as excitation to transmitting amplifier 23 which in turn supplies impulse power to the sonic transmitter unit 26. The carrier frequency sinewave output of the gate 20 is also applied to a counter circuit 24 which furnishes an output signal, after the proper number of cycles, to a modulator circuit 25. Modulator circuit 25 applies distinctive marking to one of the carrier frequency cycles in the pulse envelope furnished by transmitting amplifier 23. The distinctively marked impulses from transmitting amplifier 23 are applied to sonic transmitter 26 and propagated through the earth as sonic signals. Some of these sonic signals are partially reflected at the interfaces of sub-surface strata and return to the surface to be intercepted by sonic receiver 27. The sonic receiver 27 converts the sonic signals into electrical signals which are amplified by amplifier 28 and applied to recorder 30 which may be any type suitable to the display of a signal as a function of time. A cathode-ray oscilloscope 29 also is connected to the output of amplifier 28 so as to permit visual study of the electrical signals representing the sonic signals intercepted by sonic receiver 27.

Functioning of the system illustrated in FIGURE 3 is described more fully below, particularly with respect to the circuit waveforms shown in FIGURE 4. The carrier wave oscillator 19 furnishes a continuous sinewave output, as illustrated in waveform A of FIGURE 4, which is applied to frequency divider 21 and to gate circuit 20 which is normally non-conducting. Frequency divider 21 may be either of the regenerative or synchronized multivibrator types, both of which are well-known in the electronic art. The lower frequency output from 21 is arranged so as to trigger gating generator circuit 22 which may be a monostable multivibrator circuit designed to provide as output a rectangular gating waveform of duration equal to the desired sonic pulse length for the system, as illustrated in waveform B of FIGURE 4. Other pulse generator circuits, such as the blocking tube oscillator, may also be adapted to use as a gating generator 22.

Gate circuit 20 may be a commonly-used type employing a multi-grid amplifier, wherein the tube is normally non-conducting due to lack of screen voltage; that is to say, signals impressed on the control grid are normally ineffective in causing amplified signals to appear in the plate circuit. When a positive gating waveform is applied to the screen of the multigrid gate tube, the latter conducts and permits signals to pass from control grid to plate. Thus application of the gating waveform from generator 22 to gate circuit 20 makes the gate conducting so as to permit passage of continuous carrier wave output from oscillator 19 to transmitting amplifier 23. Output from gate 22 is a pulse envelope comprised by a number of cycles of the carrier wave output from oscillator 19, as illustrated in waveform C of FIGURE 4. It will be noted that the number of carrier wave cycles within the pulse, as well as the phase relationship between the pulse onset and the first cycle, is maintained quite constant by the synchronized frequency divider and gating arrangement described.

The output from gate 20 is applied to transmitting amplifier 23 and also to a counter circuit 24. Counter 24 may be of the usual bistable type in which cycles are counted in such a manner that an output signal results from application of the desired number of input cycles. In the present circuit the output signal from 24 is applied to a modulator circuit 25 so as to effect distinctive marking of the pulse output of transmitting amplifier 23. Referring to waveform D of FIGURE 4, it will be seen that the output of modulator 25 is a modified pulse which when applied to transmitting amplifier 26 results in a higher amplitude cycle near the middle of the pulse envelope, as shown in waveform E of FIGURE 4. The distinctively marked power pulses from transmitting amplifier 23 are then applied to sonic transmitter 26 so as to effect sonic impulses within the surface of the earth. There is a small build-up and decay time during the onset and trailing portions of the sonic impulse, due to energy considerations in transmitter 26, so that the final sonic impulse is as illustrated in waveform F of FIGURE 4. As a result of the synchronized circuit arrangement employed to effect pulse formation and distinctive marking, the sonic impulse radiated from transmitter 26 is quite stable as to number of carrier wave cycles and the location of the distinctively marked cycle within the pulse envelope.

After travel through the sub-surface, the sonic energy, and particularly the sonic signals reflected from various sub-surface beds, returns to the surface and is intercepted by sonic receiver 27. The receiver 27 converts impinging sonic signals into electrical signals which are increased in amplitude by amplifier 28. These amplified electrical signals are then applied to a signal recorder 30 which may be any type suited to the storage of the same information for future study and interpretation. For example, the recorder 30 may be a type in which one rectangular axis represents depth or time and the other rectangular axis represents signal amplitude. The record made by such a recorder is shown in FIGURE 5 wherein sonic signals are shown against a time axis. The amplified signals from amplifier 28 also are applied to a cathode-ray oscilloscope which permits additional visual study and analysis of the sonic reflections. The various controls of the oscilloscope 29 permit detailed study of the sonic signals inasmuch as both horizontal and vertical scales may be expanded as desired. For example, the distinctive marking provided by the present invention may be readily perceived on the electrical signals which represent sonic reflections.

As mentioned previously, distinctive marking of the transmitted sonic pulse, according to the present invention, provides for additional accuracy in both recognizing and timing sonic reflections from sub-surface strata. From waveform F of FIGURE 4 it is quite apparent that the marked cycle, of greater amplitude, is easily distinguished from other cycles in the pulse envelope. Referring next to the sonic record waveform of FIGURE 5, made according to the present invention, it will be noted that noise tends to obscure the onset of the reflected sonic signal 31 but that the distinctively marked cycle 32 is readily distinguished. The distinctively marked cycle 32 can also be located accurately on the time axis so as to permit calculation of the depth of the reflecting stratum when the velocity of sonic waves in the sub-surface is known. Since the initial relationship between the marked cycle and the onset of the sonic pulse is known, quite accurate timing is possible. Furthermore, it will be noted that the distinctively marked sonic pulse has a definite polarity or phase which is useful in determining the nature of a reflecting interface. For certain conditions at the interface, the sonic signal encounters phase or polarity reversal. The absence or presence of polarity reversal in the reflection on a sonic recording serves as an index to the nature of the two media comprising the subsurface interface.

While distinctive marking of the sonic pulse shown in waveform F of FIGURE 4 is achieved by increasing the amplitude of one specific cycle of the carrier wave within the pulse envelope, other types of distinctive marking are quite possible. For example, the pulse waveform of FIGURE 6 shows distinctive marking by reduction in the amplitude of a cycle 34. In the waveform shown in FIGURE 7, a notch or nick is impressed on the marked cycle 35 to provide distinctiveness. Various other marking arrangements are possible within the scope of the invention.

Having thus described the invention, I claim:

Apparatus for use in sonic geophysical exploration comprising an oscillator for generating a continuous carrier wave having separate cycles of constant frequency and amplitude, a transmitting amplifier coupled to said oscillator, a modulator coupled to said transmitting amplifier, an electronic gate interposed between said oscillator and said transmitting amplifier, a source of periodic gating waveform coupled to and synchronized with said oscillator, means connecting said source and said gate for applying said gating waveform to said gate so as to effect periodic excitation of said amplifier by said oscillator, modulating means coupled to said apparatus for distinctively marking one cycle of said carrier wave during each periodic excitation of said amplifier, a sonic transmitter coupled to said amplifier for translating the distinctively marked output of said transmitting amplifier into sonic impulses, a sonic receiver remotely positioned from said sonic transmitter for intercepting distinctively marked sonic signals resultant from said sonic impulses, said receiver converting said sonic signals into distinctively marked electrical signals, and a recorder coupled to said receiver for making a visual tracing of said distinctively marked electrical signals.

References Cited in the file of this patent

UNITED STATES PATENTS

| | | |
|---|---|---|
| 2,018,737 | Owen | Oct. 29, 1935 |
| 2,364,209 | Green | Dec. 5, 1944 |
| 2,778,002 | Howry | Jan. 15, 1957 |
| 2,780,795 | Ambrosio | Feb. 5, 1957 |
| 2,841,777 | Blake et al. | July 1, 1958 |